(12) United States Patent
Nagamura

(10) Patent No.: US 7,031,681 B2
(45) Date of Patent: Apr. 18, 2006

(54) BROADCAST RECEIVER HAVING A FUNCTION OF DISPLAYING PREVIOUSLY STORED IMAGE DURING CHANNEL SELECTION

(75) Inventor: Yoshihisa Nagamura, Daito (JP)

(73) Assignee: Funai Electric Co., Ltd., Daito (JP)

( * ) Notice: Subject to any disclaimer, the term of this patent is extended or adjusted under 35 U.S.C. 154(b) by 466 days.

(21) Appl. No.: 10/198,095

(22) Filed: Jul. 19, 2002

(65) Prior Publication Data
US 2003/0017814 A1  Jan. 23, 2003

(30) Foreign Application Priority Data
Jul. 23, 2001 (JP) .............................. 2001-222330

(51) Int. Cl.
*H04B 1/18* (2006.01)
(52) U.S. Cl. .................. 455/186.1; 455/3.02; 455/566; 455/412.1; 725/100; 725/131; 725/139
(58) Field of Classification Search ............. 455/186.1, 455/3.02, 3.03, 3.04, 3.05; 725/91, 92, 93, 725/100, 114, 131, 138, 139
See application file for complete search history.

(56) References Cited

U.S. PATENT DOCUMENTS 5,990,927 A * 11/1999 Hendricks et al. .......... 725/132
6,317,885 B1 * 11/2001 Fries ........................... 725/109
6,388,714 B1 * 5/2002 Schein et al. ................ 348/563
6,453,471 B1 * 9/2002 Klosterman .................. 725/41
6,584,153 B1 * 6/2003 Gordon et al. .......... 375/240.13

FOREIGN PATENT DOCUMENTS

JP  08-335857  12/1996
JP  11-220675  8/1999

* cited by examiner

*Primary Examiner*—Nguyen T. Vo
*Assistant Examiner*—Thuan T Nguyen
(74) *Attorney, Agent, or Firm*—Crowell & Moring LLP

(57) ABSTRACT

A broadcast receiver retrieves from a database the image of a program on a user-selected channel which was stored previously at the same time so as to display the image on a display device, in response to a channel selection command by a user. If a broadcast exists on the user-selected channel, the broadcast receiver displays the broadcast program on the display device. If no broadcast exists on the user-selected channel, the broadcast receiver displays a message that there is no corresponding broadcast on the display device. By viewing, during the channel selection, the displayed image of the program stored previously, the user can ascertain whether or not the channel being selected is the same channel as the user desires to view. If the channel is not the desired channel, the user can provide a second channel selection command while the preceding channel selection is performed. This permits the user to select a desired channel quickly.

11 Claims, 2 Drawing Sheets

BROADCAST RECEIVER HAVING A FUNCTION OF DISPLAYING PREVIOUSLY STORED IMAGE DURING CHANNEL SELECTION

BACKGROUND OF THE INVENTION

The present invention relates to a broadcast receiver for digital television broadcasting or the like that enables a user to select a desired channel quickly and easily.

In recent years, digital television broadcasting such as BS (Broadcasting Satellite) digital television broadcasting or CS (Communications Satellite) digital television broadcasting has been transmitted and spreading rapidly due to the advancement of technology. In the digital television broadcasting, broadcasting stations transmit signals on a plurality of channels encoded using digital compression technology in a state of time division multiplex in a frequency band. In other words, television broadcasting signals on a plurality of channels are transmitted in a multiplex system in a frequency band. Also, the multiplex digital broadcasting signals are provided with channel information signals which are needed to reconstruct signals on a user-selected channel from the compressed multiplex signals. The channel information signals are added to the digital broadcasting signals every a few seconds so as to be transmitted together with the digital broadcasting signals.

On the other hand, at the time of reception of a channel selection command from a user, the broadcast receiver first receives digital broadcasting signals in a frequency band corresponding to the user-selected channel and extracts channel information signals contained in the received signals. Next, the broadcast receiver extracts separately signals on the user-selected channel from the received digital broadcasting signals based on the extracted channel information signals. Further, the broadcast receiver reconstructs the separately extracted signals into the state before compressed, thus reproducing the broadcasting signals on the user-selected channel. Therefore, it takes the broadcast receiver about 5 to 10 seconds to reproduce the broadcasting signals on the corresponding channel from the received digital broadcasting signals although the broadcast receiver starts the channel selection as soon as receiving the channel selection command. This causes the broadcast receiver to display a picture of no signals with no image on the display device during the period.

Moreover, a time zone for television broadcasting depends on the channel. Sometimes there is television broadcasting on a channel in a certain time zone, when there is no television broadcasting on other channels. When there is no broadcasting on the user-selected channel, the broadcast receiver fails to obtain the broadcasting signals, thus continuing to display the picture of no signals with no image on the display device.

There have been conventionally broadcast receivers which are arranged to display, during a channel selection, a message that the channel is being selected on the display device so as to inform a user whether the channel selection is being performed or there is no broadcasting on the channel. Such a receiver displays the message that the channel is being selected while performing the channel selection. As a result of the channel selection, if a television broadcast is found on the channel, the receiver erases the message and displays the image of the television broadcast, otherwise, the receiver displays a picture of no signals with no image after erasing the message.

Also, there have been channel search devices for television receivers known that select in order each of several channels which have been selected in the past and that cause multiple images of those channels to be displayed when a user operates channel search means to start a channel search (e.g., Japanese Patent Laid-open Publication No. 8-335857). Further, there have been known digital broadcast receivers that search for (select in order) and display programs on channels in order from the most frequently selected channel in the time zone when a user operates a remote control unit to provide a program search command (e.g., Japanese Patent Laid-open Publication No. 11-220675).

However, the above mentioned conventional broadcast receivers simply display the message that the channel is being selected for about 5 to 10 seconds from the reception of the channel selection command from a user until the receivers complete the selecting operation to display the image of the television broadcast. That is, during the period, the user can obtain no information for ascertaining whether or not the selected channel is the same channel as he or she desires to view. Once the user provides the channel selection command, he or she only waits for the image of the television broadcast to be displayed so as to ascertain whether or not the selected channel is his or her desired channel.

Hence, even if the user-selected channel is not the desired channel, the user must wait till the image of the broadcast is displayed so as to confirm the contents and then select another channel. That is, once providing a channel selection command, the user must wait for about 5 to 10 seconds to confirm the broadcast contents on the channel, and as a result, if the displayed image is not that of the desired program, the user must provide another channel selection command and further wait for about 5 to 10 seconds. As described above, the conventional broadcast receivers do not permit a user to confirm the contents of program during selecting a channel and take time to select the desired channel.

Neither of the disclosures in the above mentioned prior arts, Japanese Patent Laid-open Publication Nos. 8-335857 and 11-220675, are designed to solve the above mentioned problems in during channel selections.

SUMMARY OF THE INVENTION

It is an object of the present invention to solve the above mentioned problems and to provide a broadcast receiver that permits a user to confirm, during a channel selection, contents of a program on a channel being selected by viewing the image thereof and that enables the user to select a desired channel quickly and easily.

In order to achieve the above mentioned object, in accordance with an aspect of the present invention, a broadcast receiver comprises: an input unit for entering a selection command of a channel which a user desires to view, a receiving unit for receiving digital/analog broadcasting signals in a frequency band corresponding to the channel selected via the input unit, a signal extracting unit for analyzing the digital/analog broadcasting signals received by the receiving unit to extract channel information signals from the digital/analog broadcasting signals and for extracting image signals and audio signals which correspond to the user-selected channel from the digital/analog broadcasting signals based on the extracted channel information signals, a signal decoding unit for decoding the image signals and the audio signals extracted by the signal extracting unit and transmitting the decoded signals to a display device for displaying an image and to an audio output unit for generating an audio output, an on-screen display ("OSD") output unit for generating a prescribed OSD display on the display device, a control unit, in response to a channel change command received via the input unit, for controlling each of the units such that a frequency to be received by the receiving unit is changed to a frequency corresponding to the user-selected channel and the image signals and the audio signals which correspond to the user-selected channel are extracted from the digital/analog broadcasting signals to be received thereat, whereby to perform the channel selection of the user-selected channel, the broadcast receiver comprising: a database for storing the received image signals associated with reception time and the channel information signals, wherein the control unit controls each of the units such that, when the broadcast receiver receives broadcasting signals, the received image signals are stored in the database associated with the reception time and the channel information signals, wherein, in response to a channel selection command received via the input unit from a user, the control unit retrieves from the database image signals on the user-selected channel stored at a given period of time before corresponding to the time of the channel selection command so as to cause the display device to display the image on the basis of the image signals while causing the display device to display a message that the channel is being selected via the OSD output unit, wherein, in response to a second channel selection command received via the input unit from the user during the channel selection, the control unit immediately retrieves from the database image signals on the user-selected channel stored at a given period of time before corresponding to the time of the second channel selection command so as to cause the display device to display the image on the basis of the image signals while causing the display device to display the message that the channel is being selected via the OSD output unit.

This structure permits the receiver, in response to the channel selection command received from the user, to start the channel selection and to display, while performing the channel selection, the image on the user-selected channel received at the given period of time before corresponding to the time of the channel selection command together with the message that the channel is being selected. By viewing the image, the user can ascertain whether or not the channel being selected is the desired channel. As a result, if the channel being selected is not the desired channel, the user can provide a second channel selection command while the channel selection is being performed. On receiving the second channel selection command from the user during the channel selection, the broadcast receiver immediately starts a channel selection for the second command. Moreover, the broadcast receiver displays, during the channel selection, the image on the user-selected channel received at the given period of time before corresponding to the time of the second channel selection command together with the message that the channel is being selected. Thus, the user can select a desired channel quickly.

In accordance with another aspect of the present invention, a broadcast receiver comprises: an input unit for entering a selection command of a channel which a user desires to view, a receiving unit for receiving digital/analog broadcasting signals in a frequency band corresponding to the channel selected via the input unit, a signal extracting unit for analyzing the digital/analog broadcasting signals received by the receiving unit to extract channel information signals from the digital/analog broadcasting signals and for extracting image signals and audio signals which correspond to the user-selected channel from the digital/analog broadcasting signals based on the extracted channel information signals, a signal decoding unit for decoding the image signals and the audio signals extracted by the signal extracting unit and transmitting the decoded signals to a display device for displaying an image and to an audio output unit for generating an audio output, a control unit, in response to a channel change command received via the input unit, for controlling each of the units such that a frequency to be received by the receiving unit is changed to a frequency corresponding to the user-selected channel and the image signals and the audio signals which correspond to the user-selected channel are extracted from the digital/analog broadcasting signals to be received thereat, whereby to perform the channel selection of the user-selected channel, the broadcast receiver comprising: a database for storing the received image signals associated with reception time and the channel information signals, wherein the control unit controls each of the units such that, when the broadcast receiver receives broadcasting signals, the received image signals are stored in the database associated with the reception time and the channel information signals, wherein, in response to a channel selection command received via the input unit from a user, the control unit retrieves from the database image signals on the user-selected channel stored at a given period of time before corresponding to the time of the channel selection command so as to cause the display device to display the image on the basis of the image signals.

This structure permits the broadcast receiver to display, during the channel selection, the image on the user-selected channel received at the given period of time before corresponding to the time of the channel selection command. By viewing the image, the user can ascertain whether or not the channel being selected is the same channel as the user desires.

In the broadcast receiver, in response to a second channel selection command received via the input unit from the user during the channel selection, the control unit may immediately retrieve from the database image signals on the user-selected channel stored at a given period of time before corresponding to the time of the second channel selection command so as to cause the display device to display the image on the basis of the image signals. This permits the user to provide the second channel selection command immediately when the user judges the image displayed during the channel selection to be different from that on the desired channel, whereby the broadcast receiver starts at once a channel selection in response to the second command and displays the image on the user-selected channel received at the given period of time before corresponding to the time of the second channel selection command. Thus, the user can select a desired channel quickly.

Moreover, in the broadcast receiver, the control unit may retrieve image signals stored at either a week before or a day before as the image signals stored at the given period of time before so as to cause the display device to display the image on the basis of the image signals. This permits the broadcast receiver to display, during the channel selection, the image on the user-selected channel received at either a week before or a day before which corresponds to the time of the channel selection command. As programs are usually broadcast every week or every day, displaying the image of a program at a week before or a day before on the same channel as the channel being selected permits the user to ascertain that the channel being selected is the desired channel.

DETAILED DESCRIPTION OF THE PREFERRED EMBODIMENT OF THE PRESENT INVENTION

Figure 1:
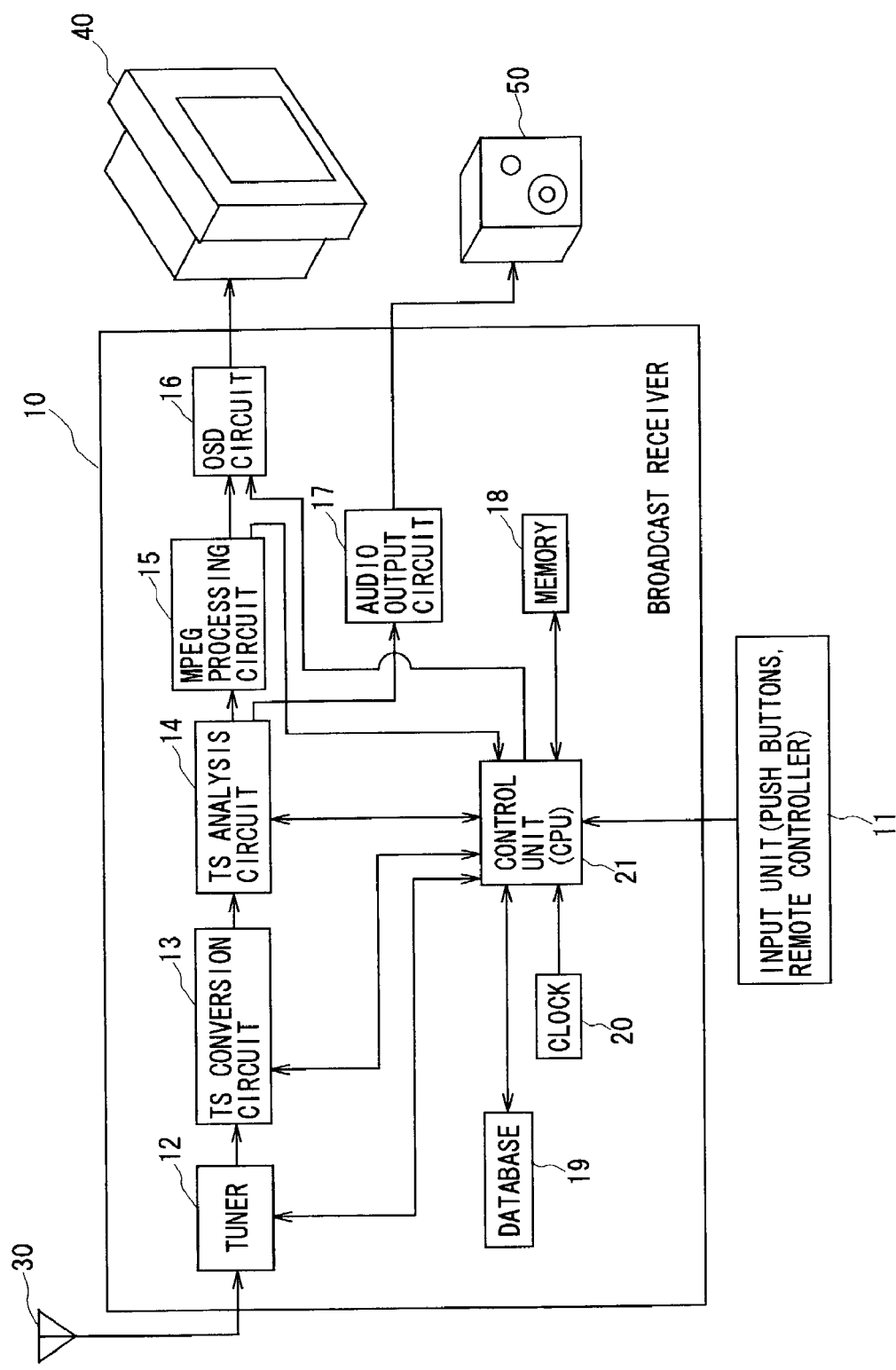
FIG. 1 is a schematic block diagram of a broadcast receiver according to an embodiment of the present invention.

An embodiment of the present invention is now described below referring to the accompanying drawings. First, FIG. 1 shows a block diagram of a broadcast receiver according to this embodiment. A broadcast receiver 10 is an apparatus for receiving television broadcasting signals transmitted electrically on high-frequency waves with a prescribed frequency from broadcasting stations and for reproducing image signals and audio signals of the television broadcast on a user-selected channel. The broadcast receiver 10 is connected to an antenna 30 for receiving the high-frequency waves transmitted from the broadcasting stations, to a television set (a display device) 40 for displaying as an image the image signals of the television broadcast reproduced by the broadcast receiver 10, and to a speaker (an audio output unit) 50 for generating an audio output on the audio signals of the television broadcast reproduced by the broadcast receiver 10.

The broadcast receiver 10 comprises an input unit 11 such as push buttons or a remote controller, a tuner (a receiving unit) 12, a TS (Transport Stream) conversion circuit 13, a TS analysis circuit (a signal extracting unit) 14, an MPEG (Moving Picture Experts Group) processing circuit (a signal decoding unit) 15, an OSD (On-Screen Display) circuit (an OSD output unit) 16, an audio output circuit 17, a memory 18, a database 19, a clock 20, and a control unit 21. The database 19 is provided in an image storage medium such as an image memory, a CD-RW (ReWritable) or the like for storing the image signals of received broadcasts associated with reception time and channel information signals.

A user provides a channel selection command by operating the input unit 11, the signals from which cause the channel to be selected. The tuner 12 tunes to a frequency on television broadcasting signals transmitted from a broadcasting station corresponding to the channel selected via the input unit 11 so as to receive the television broadcasting signals transmitted from the broadcasting station in a high-frequency signal aspect via the antenna 30.

Where the received television broadcasting signals are digital broadcasting signals, the TS conversion circuit 13 demodulates the high-frequency signals received by the tuner 12 and converts the received signals into a stream signal, that is, a multiple signal including compressed image signals and compressed audio signals on a plurality of channels. The TS analysis circuit 14 analyzes the stream signal obtained by the conversion at the TS conversion circuit 13 so as to extract, based on channel information signals added to the stream signal, the compressed image signals and the compressed audio signals of the television broadcast corresponding to the user-selected channel from the stream signal. The MPEG processing circuit 15 decodes the compressed image signals and the compressed audio signals extracted by the TS analysis circuit 14 to the state as before the compression so as to reproduce the image signals and the audio signals of the television broadcast on the user-selected channel. Then, the reproduced image signals are transmitted to the television set 40 via the OSD circuit 16 while the reproduced audio signals are transmitted to the speaker 50 via the audio output circuit 17.

On the other hand, where the received television broadcasting signals are analog broadcasting signals, the TS conversion circuit 13 demodulates the high-frequency signals received by the tuner 12, thereby reproducing the image signals and the audio signals of the television broadcast on the user-selected channel. Then, the reproduced image signals are transmitted to the television set 40 via the TS analysis circuit 14, the MPEG processing circuit 15, and the OSD circuit 16 while the reproduced audio signals are transmitted to the speaker 50 via the TS analysis circuit 14, the MPEG processing circuit 15, and the audio output circuit 17.

The OSD circuit 16 superimposes prescribed on-screen display data on the image signals transmitted from the MPEG processing circuit 15. This causes the television set 40 to display the image of the television broadcast according to the image signals in a state where an image according to the on-screen display data is superimposed. The memory 18 has stored a television broadcasting frequency on each channel transmitted from each broadcasting station and various on-screen display data. Also, the memory 18 stores the channel information signals added to the received digital broadcasting signals.

The data base 19 stores the image signals transmitted from the MPEG processing circuit 15 associated with the channel number thereof and the time thereat indicated by the clock 20. That is, in the database 19, the image of the television broadcast program displayed on the television set 40 is stored together with the channel number and the broadcasting time thereof.

On receiving a channel selection command via the input unit 11, the control unit 21 starts the channel selection and controls the tuner 12 such that it tunes to the frequency on the user-selected channel. Then, if the channel selected via the input unit 11 is a digital broadcasting channel, the control unit 21 controls the TS conversion circuit 13, the TS analysis circuit 14, and the MPEG processing circuit 15 respectively so that digital broadcasting signal processing is executed. On the other hand, if the channel selected via the input unit 11 is an analog broadcasting channel, the control unit 21 controls the TS conversion circuit 13, the TS analysis circuit 14, and the MPEG processing circuit 15 respectively so that analog broadcasting signal processing is executed. Further, at the time of reception of a second channel selection command during selecting the channel, the control unit 21 immediately stops the preceding channel selection and starts a channel selection for the second user-selected channel.

Moreover, during the channel selection, the control unit 21 retrieves from the database 19 image signals at the same time of a week before on the same channel as the channel being selected, and then causes, via the OSD circuit 16, the television set 40 to display the image signals as a still image. Specifically, the control unit 21 controls the receiver such that the television set 40 displays, during the channel selection, the image of the television program broadcast on the channel being selected at the same time of a week before as a still image. Also, the control unit 21 retrieves the on-screen display data stored in the memory 18 to input it to the OSD circuit 16, whereby the number of the channel being selected, a message that the channel is being selected and the broadcasting date of the image being displayed are displayed in a state of superposition on the image of the television program broadcast on the channel being selected at the same time of a week before.

Further, the control unit 21 determines the existence of broadcasting signals which correspond to the user-selected channel, based on the channel information signals added to the stream signal obtained by the conversion at the TS conversion circuit 13. As a result, if the broadcasting signals exist, the control unit 21 controls the TS conversion circuit 13, the TS analysis circuit 14 and the MPEG processing circuit 15 respectively so that the image of the broadcast program is displayed on the television set 40. On the other hand, if the broadcasting signals do not exist, the control unit 21 retrieves the on-screen display data stored in the memory 18 to input it to the OSD circuit 16, thus causing the television set 40 to display a message that there is no corresponding broadcast.

Further, while controlling the receiver so that the broadcasting signals transmitted from the broadcasting station are received and the image of the broadcast program is displayed on the television set 40, the control unit 21 causes the database 19 to store the image signals outputted from the MPEG processing circuit 15 associated with the channel number thereof and the time indicated by the clock 20. This storing process is not here described in detail by using a flowchart. Preferably, immediately after a reception of broadcasting signals is started, the image signals are stored in the database 19 as a still image or a moving picture for a few seconds.

Figure 2:
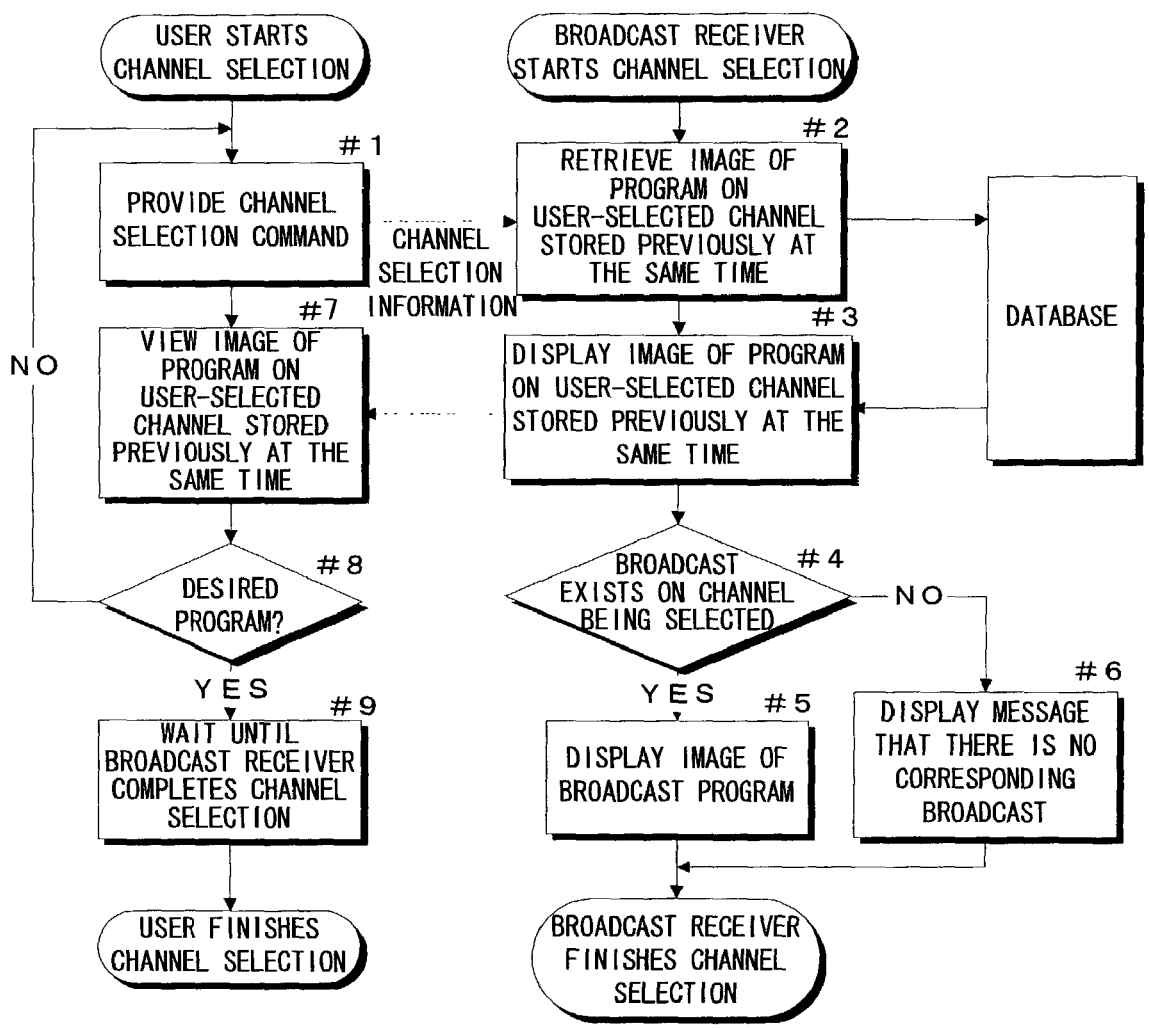
FIG. 2 is a flowchart showing the operation process of the receiver in a channel selection.

Now, the process executed at the time of reception of a channel selection command provided via the input unit 11 is described referring to the flowchart of FIG. 2. First, a user provides a channel selection command using the input unit 11 (#1). This causes the user-selected channel to be inputted as channel selection information to the control unit 21 of the broadcast receiver 10.

Figure 3:
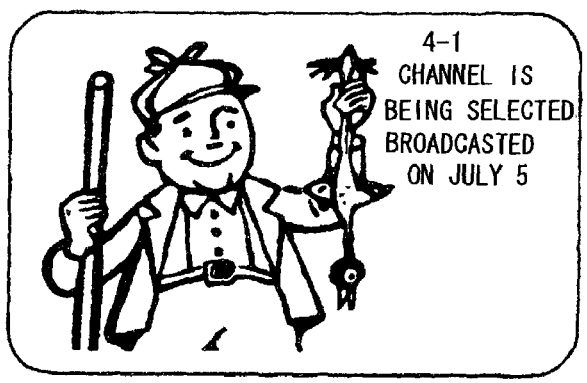
FIG. 3 is an illustration of an image displayed on the display device of the receiver.

On receiving the channel selection information, the broadcast receiver 10 retrieves the image of a program on the user-selected channel stored in the database 19 previously (for example, a week before) at the same time (#2). Then, the broadcast receiver 10 transmits the image retrieved from the database 19 as image signals to the television set 40, thus displaying the image of the program on the user-selected channel stored previously at the same time on the display of the television set 40 (#3). For example, it is assumed that the number of the user-selected channel is "4-1" and that the channel selection date is July 12. As shown in FIG. 3, the display of the television set 40 displays, while displaying the image of the program stored before, the number of the channel being selected, the message that the channel is being selected and the broadcasting date of the image being displayed on the upper right of the display. This picture is kept displayed till the channel selection is completed.

Further, the broadcast receiver 10 continuously performs the channel selection after displaying on the display of the television set 40 the image of the program stored before at the same time on the channel being selected. As a result, if a broadcast exists on the channel being selected (#4: Yes), the broadcast receiver 10 displays the image of the broadcast program on the television set 40 (#5). On the other hand, if no broadcast exists on the channel (#4: No), the broadcast receiver 10 displays on the television set 40 the message that there is no corresponding broadcast (#6).

The user can view the image of the program on the user-selected channel, displayed at #3, which was stored previously at the same time (#7). This permits the user to ascertain, based on the image, whether or not the program is the same as the user desires to view (#8) while the broadcast receiver 10 is performing the channel selection. If the program is his or her desired program (#8: Yes), the user waits until the broadcast receiver 10 completes the channel selection (#9). If the program is not his or her desired program (#8: No), the user can immediately provide a second channel selection command. When receiving the immediate second command from the user, the broadcast receiver 10 repeats, with respect to the new user-selected channel, the input as channel selection information to the control unit 21. In response to the new channel selection information received during the channel selection, the broadcast receiver 10 stops the preceding channel selection and then repeats the above mentioned process with regard to the new user-selected channel, while the user also repeats the above mentioned operations.

The present invention can be modified in various ways without being limited to the above mentioned embodiment. For example, while it is described that the broadcast receiver in the above mentioned embodiment displays as a still image the image of the program on the user-selected channel stored at the same time of a week before during the channel selection, the image of a program stored a day before may be displayed as an alternative to the image of the program stored a week before. As television broadcasts are generally programmed in weeks or in days, displaying the image of the broadcast program at a week before or a day before is suited for ascertaining whether or not the channel being selected is the desired channel. Also, the image may be displayed as a moving picture, instead of as the still image. Further, as well as displaying the image of the program at a week before or a day before, the broadcast receiver may generate audio output derived from the program together with the displayed image.

What is claimed is:

1. A broadcast receiver comprising: an input unit for entering a selection command of a channel which a user desires to view, a receiving unit for receiving digital/analog broadcasting signals in a frequency band corresponding to the channel selected via the input unit, a signal extracting unit for analyzing the digital/analog broadcasting signals received by the receiving unit to extract channel information signals from the digital/analog broadcasting signals and for extracting image signals and audio signals which correspond to the user-selected channel from the digital/analog broadcasting signals based on the extracted channel information signals, a signal decoding unit for decoding the image signals and the audio signals extracted by the signal extracting unit and transmitting the decoded signals to a display device for displaying an image and to an audio output unit for generating an audio output, an on-screen display ("OSD") output unit for generating a prescribed OSD display on the display device, a control unit, in response to a channel change command received via the input unit, for controlling each of the units such that a frequency to be received by the receiving unit is changed to a frequency corresponding to the user-selected channel and the image signals and the audio signals which correspond to the user-selected channel are extracted from the digital/analog broadcasting signals to be received thereat, whereby to perform the channel selection of the user-selected channel, the broadcast receiver comprising:

a database for storing the received image signals associated with reception time and the channel information signals, wherein the control unit controls each of the units such that, when the broadcast receiver receives broadcasting signals, the received image signals are stored in the database associated with the reception time and the channel information signals, wherein, in response to a channel selection command received via the input unit from a user, the control unit automatically retrieves from the database image signals on the user-selected channel, the image signals being stored at a given period of time, the given period of time corresponding to the time the channel selection command is received so as to cause the display device to display the image on the basis of the image signals while causing the display device to display a message that the channel is being selected via the OSD output unit, wherein, in response to a second channel selection command received via the input unit from the user during the channel selection, the control unit immediately retrieves from the database image signals on the user-selected channel stored at a given period of time before corresponding to the time of the second channel selection command so as to cause the display device to display the image on the basis of the image signals while causing the display device to display the message that the channel is being selected via the OSD output unit.

2. The broadcast receiver as set forth in claim 1, wherein the control unit retrieves image signals stored at either a week before or a day before as the image signals stored at the given period of time before so as to cause the display device to display the image on the basis of the image signals.

3. The broadcast receiver as set forth in claim 2, wherein the reception time of the retrieved image signals are a same time, at either the week before or the day before, as the time of the channel selection command.

4. A broadcast receiver comprising: an input unit for entering a selection command of a channel which a user desires to view, a receiving unit for receiving digital/analog broadcasting signals in a frequency band corresponding to the channel selected via the input unit, a signal extracting unit for analyzing the digital/analog broadcasting signals received by the receiving unit to extract channel information signals from the digital/analog broadcasting signals and for extracting image signals and audio signals which correspond to the user-selected channel from the digital/analog broadcasting signals based on the extracted channel information signals, a signal decoding unit for decoding the image signals and the audio signals extracted by the signal extracting unit and transmitting the decoded signals to a display device for displaying an image and to an audio output unit for generating an audio output, a control unit, in response to a channel change command received via the input unit, for controlling each of the units such that a frequency to be received by the receiving unit is changed to a frequency corresponding to the user-selected channel and the image signals and the audio signals which correspond to the user-selected channel are extracted from the digital/analog broadcasting signals to be received thereat, whereby to perform the channel selection of the user-selected channel, the broadcast receiver comprising:

a database for storing the received image signals associated with reception time and the channel information signals, wherein the control unit controls each of the units such that, when the broadcast receiver receives broadcasting signals, the received image signals are stored in the database associated with the reception time and the channel information signals, wherein, in response to a channel selection command received via the input unit from a user, the control unit automatically retrieves from the database image signals on the user-selected channel, the image signals being stored at a given period of time, the given period of time corresponding to the time the channel selection command is received so as to cause the display device to display the image on the basis of the image signals.

5. The broadcast receiver as set forth in claim 4, wherein, in response to a second channel selection command received via the input unit from the user during the channel selection, the control unit immediately retrieves from the database image signals on the user-selected channel stored at a given period of time before corresponding to the time of the second channel selection command so as to cause the display device to display the image on the basis of the image signals.

6. The broadcast receiver as set forth in claim 4, wherein the control unit retrieves image signals stored at either a week before or a day before as the image signals stored at the given period of time before so as to cause the display device to display the image on the basis of the image signals.

7. The broadcast receiver as set forth in claim 6, wherein the reception time of the retrieved image signals are a same time, at either the week before or the day before, as the time of the channel selection command.

8. A method for operating a broadcast receiver, comprising the acts of:

storing, in a database, received image signals and an associated time;

receiving, from a source external to the broadcast receiver, a channel selection command, wherein, in response to receipt of the channel selection command, the broadcast receiver performs the acts of retrieving, from the database, stored image signals on a channel corresponding to a channel selected by the channel selection command, the retrieved stored image signals being stored at a given period of time corresponding to the time the channel selection command is received; and outputting the retrieved stored image signals.

9. The method of claim 8, wherein, while the retrieved image signals are output, the method further comprise the act:

outputting a message that the channel is being selected.

10. The method of claim 8, further comprising the acts of:

outputting a channel corresponding to the channel selection command, wherein received image signals of the channel are stored in the database.

11. The method of claim 8, wherein the retrieved stored image signals are stored at either a week before or a day before the receipt of the channel selection command.

* * * * *